US 6,564,557 B1

(12) United States Patent
Dailey

(10) Patent No.: US 6,564,557 B1
(45) Date of Patent: May 20, 2003

(54) COOLING ARRANGEMENT

(75) Inventor: Geoffrey M Dailey, Derby (GB)

(73) Assignee: Rolls-Royce plc, London (GB)

( * ) Notice: Subject to any disclaimer, the term of this patent is extended or adjusted under 35 U.S.C. 154(b) by 7 days.

(21) Appl. No.: 09/910,060

(22) Filed: Jul. 23, 2001

(30) Foreign Application Priority Data

Aug. 4, 2000 (GB) .............................................. 0019016

(51) Int. Cl.⁷ ................................................. F02C 7/12

(52) U.S. Cl. ......................................................... 60/806

(58) Field of Search .................................. 60/785, 806

(56) References Cited

FOREIGN PATENT DOCUMENTS

| GB | 2 078 859 A | 1/1982 |
| GB | 2 183 296 A | 6/1987 |
| GB | 2 194 592 A | 3/1988 |
| GB | 2 224 080 A | 4/1990 |

*Primary Examiner*—Ehud Gartenberg
(74) *Attorney, Agent, or Firm*—W. Warren Taltavull; Manelli, Denison & Selter PLLC

(57) ABSTRACT

Cooling air enters a cooling path 56 from a supply at 58. The path follows a serpentine path consecutively through a number of components to be cooled, including guide vanes 38, 40, blades 30, a shroud 54 and a shaft 18. A valve 68 is provided at the downstream end of the path 56. The setting of the valve 56 modulates the flow and pressure of air along the path 56, without wholly preventing it.

13 Claims, 2 Drawing Sheets

US 6,564,557 B1

COOLING ARRANGEMENT

FIELD OF THE INVENTION

The present invention relates to cooling arrangements for use within gas turbine engines.

BACKGROUND OF THE INVENTION

A conventional gas turbine engine incorporates many components which are exposed to the heat of combustion during operation, and which require cooling in order for the engine to perform properly.

SUMMARY OF THE INVENTION

The present invention provides a cooling arrangement for a gas turbine engine, the arrangement comprising at least one passage providing a path for cooling air from a cooling air supply and through at least one component of the engine, and valve means in the path and operable to modulate the flow of cooling air along the path, the valve means being located downstream of at least one location which is cooled, in use, by the cooling air.

The valve may be located at the downstream end of that part of the path which passes through the said component. The valve may be located downstream of the said component. Preferably the path passes through a plurality of engine components, the valve means being located downstream of at least one of the components. Preferably the path passes consecutively through a plurality of engine components.

The components may include at least one fixed component, such as a nozzle guide vane or shroud segment. The components may include at least one movable component, such as a fan blade, compressor blade or turbine blade. The path may extend through a shaft by which the movable component is carried, and may extend generally radially between the shaft and the movable component.

Spurs may be provided from the path, to provide cooling air to positive pressure seals.

Preferably the valve means, when opened, allows cooling air to discharge from the downstream end of the path into the combustion gas stream of the engine.

BRIEF DESCRIPTION OF THE DRAWINGS

Examples of the present invention will now be described in more detail, by way of example only, and with reference to the accompanying drawings, in which.

DESCRIPTION OF THE INVENTION

Figure 1:
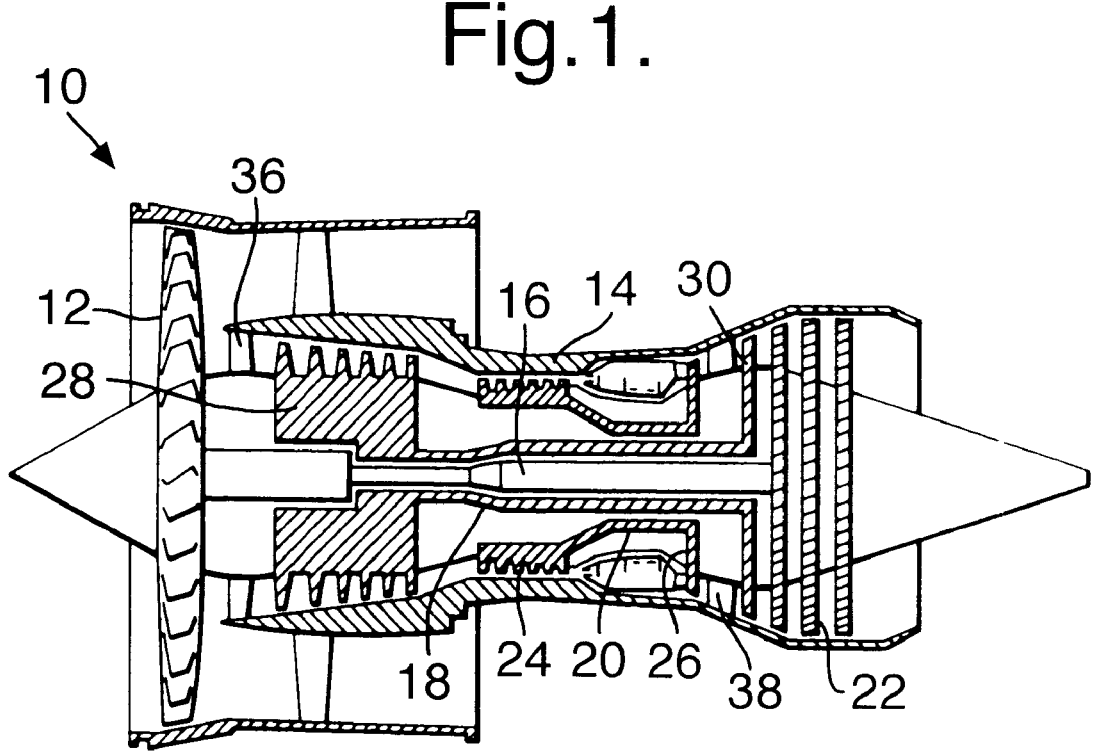
FIG. 1 is a schematic diagram of a conventional gas turbine engine.

FIG. 1 shows a conventional gas turbine engine 10. The engine 10 comprises a front fan assembly 12 and a core engine 14. The engine is of the ducted fan by-pass type and in this example has three relatively rotatable shafts including a low pressure shaft 16, an intermediate pressure shaft 18, and a high pressure shaft 20. The low pressure shaft 16 is a load transmitting shaft interconnecting the fan 12 and a turbine assembly 22 located at the downstream end of the core engine 14. The intermediate pressure shaft 18 is a hollow load transmitting shaft concentrically disposed around the shaft 16 and interconnecting a multi-stage axial flow compressor 28 and a turbine rotor assembly 30. The high pressure shaft 20 is similarly a hollow load transmitting shaft concentric with the shafts 16 and 18, and interconnecting a multi-stage axial flow compressor 24 and a turbine rotor assembly 26.

Vanes are provided at various locations within the engine 10, to improve gas flow. For example, stator vanes 36 are provided immediately upstream of the IP compressor 28. Nozzle guide vanes 38 are provided immediately upstream of the IP turbine 30. The vanes 36, 38 are shown highly schematically in FIG. 1. Additional vanes, not shown for reasons of clarity, would conventionally be provided at other locations along the gas flow path.

The engine 10 is conventional to the extent so far described in relation to FIG. 1, in the preceding two paragraphs.

Figure 2:
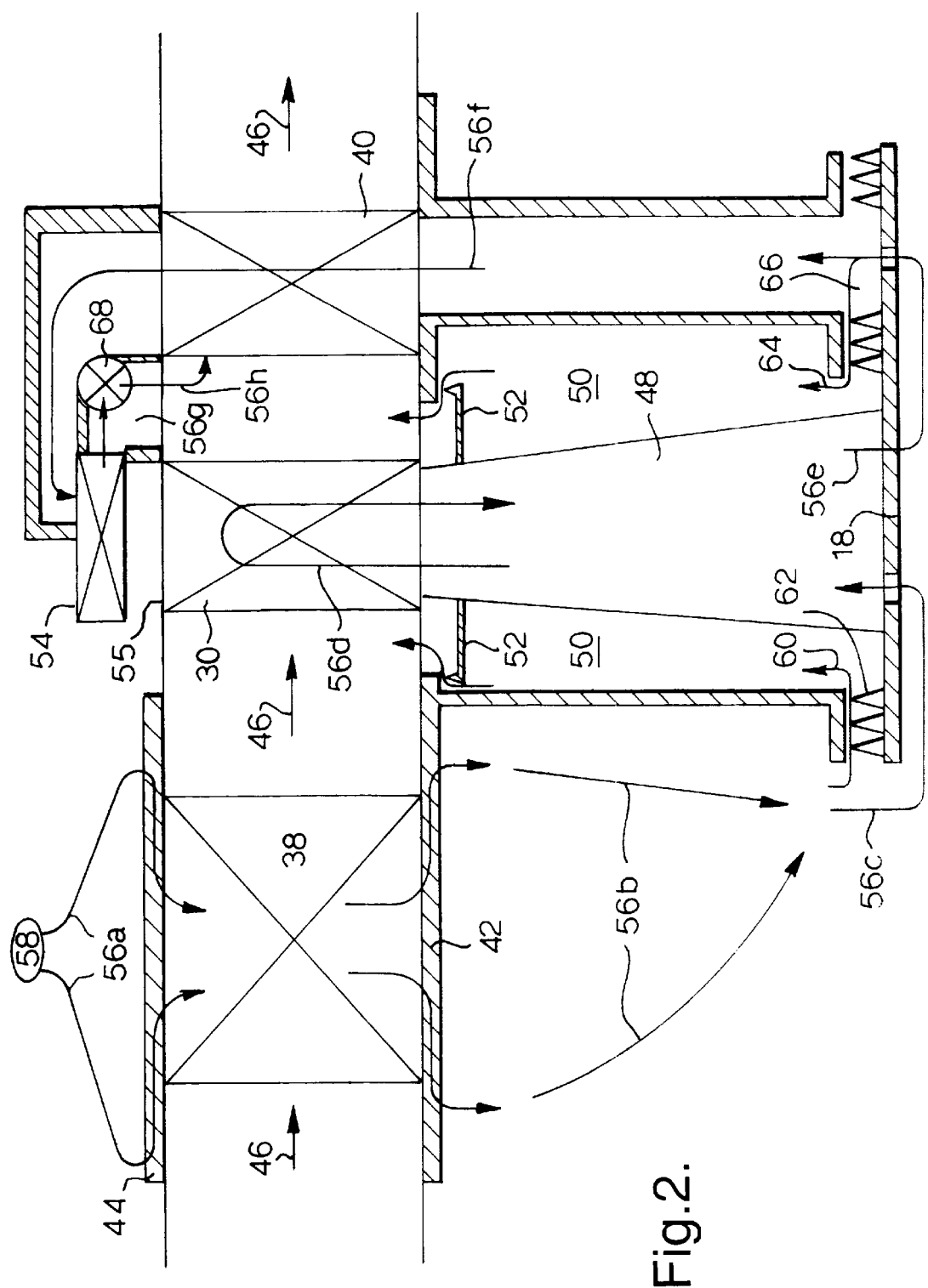
FIG. 2 is an enlarged and highly schematic partial view of part of the engine of FIG. 1, after modification to incorporate features embodying the present invention.

The various components described above, and other components within the engine 10, require cooling during engine operation, as is well known. FIG. 2 illustrates in more detail an arrangement in accordance with the invention, providing cooling of some of these components.

FIG. 2 illustrates part of the axial length of the engine, from the intermediate pressure nozzle guide vanes 38, at the upstream end of the drawing, down to the low pressure nozzle guide vanes 40 at the downstream end of the drawing. In more detail, the IP vanes 38 extend between an inner supporting annulus 42 and an outer supporting annulus 44, thereby spanning the annular channel through which engine combustion gases pass, during use, generally in the direction of the arrow 46. The IP vanes 38 are provided to direct the flow of these gases against the blades of the IP turbine 30, downstream of the IP vanes 38.

The low pressure vanes 40 are mounted in similar manner to the IP vanes 38, between the inner annulus 42 and outer annulus 44 to span the combustion gas path 46, for directing combustion gases to the LP turbine 22, downstream of the vanes 40, but not shown in FIG. 2.

The IP turbine 30 consists of a ring of blades projecting generally radially from the outer circumference of a disc 48 which in turn is fixed for rotation with the IP shaft 18. The disc 48 is accommodated in a cavity 50 between the structures which support the fixed IP vanes 38, and the fixed LP vanes 40. The disc 48 is free to rotate with the shaft 18, within the cavity 50. Seals are provided at 52 to provide seals between the rotating disc 48 and the neighbouring fixed structures, to prevent combustion gases leaking from the combustion gas path 46 into the cavity 50.

An annular shroud 54 is located around the tips of the turbine blades 30, for conventional reasons.

Cooling of the various components shown in FIG. 2 is provided in accordance with the invention by means of a cooling air path 56. The cooling path 56 is schematically represented by arrows, but detailed representations of the passages and other structures used to form the path 56 are not shown on the drawings, but will be readily provided by the skilled man once the route and purpose of the path have been explained.

The cooling path 56 begins at a supply 58 of cooling air, which may be of any conventional form, such as air drawn from one of the compressors 24, 28. The path 56 first passes (at 56a) generally radially from the outer annulus 44 through the IP vanes 38, to the inner annulus 42, thereby achieving cooling of the vanes 38.

From the inner annulus 42, the cooling path (at 56b) then passes down into the IP shaft 18. At this position, a spur 60 is allowed to branch from the main path 56 to leak into the cavity 50 through seals 62, providing a positive pressure to assist in sealing. Cooling air from the spur 60 can then provide a positive pressure leak through the seals 52, to reduce or prevent ingestion of combustion gases from the combustion gas path 46.

Once within the shaft 18, the cooling path 56c extends up into the disc 48. A section 56d then passes out from the radially outer edge of the disc 48, through the IP blades 30, up to their tip 55, and then returns in the reverse (radially inwardly) direction back to the disc 48. From the disc 48, the path 56e extends back into the IP shaft 18 and then out (again in the generally radially outward direction) toward the LP vanes 40. Again, a spur 64 provides a leak into the cavity 50 to provide positive pressure to assist seals 66 and then to assist seals 52.

The main cooling path 56 extends from the shaft 18 out to the LP vanes 40. The path 56f passes generally radially outwardly through the LP vanes 40 to the outer annulus 44 and then to the shroud 54. The path 56 then passes through the shroud 54 to a valve 68, from which the path 56h can discharge into the main combustion gas path 46. The significance of the valve 68 will be described below.

It can therefore be seen from FIG. 2 and from the description set out above, that the cooling path 56 describes a serpentine route through various components of the engine 10, passing consecutively through the IP vanes 40, the IP shaft 18, the disc 48, the IP blades 30, the disc 48, the IP shaft 18, the LP vanes 40, the shroud 54, and then into the combustion gas path 46.

The cooling path 56 is thus provided by passages extending through the body of the components being cooled.

It is envisaged that in order to cool a plurality of components in this way, the airflow through the path 56 will be higher than is required in conventional cooling arrangements in which components are individually cooled. However, this increased cooling flow rate may make the components simpler and cheaper to design and manufacture. Appropriate design of the path 56 is expected to allow minimal air discharge from the path 56 prior to the valve 68, while allowing the pressure of the airflow to be distributed among the components as is required according to the cooling necessary.

To this point, the description has implicitly assumed that the valve 68 is open. The significance of the valve 68 can now be described as follows. First, it is to be noted that there is no valve between the upstream end of the path 56 and the supply 58, so that the supply 58 continuously feeds the upstream end of the path 56. When the valve 68 is open, the situation described above will pertain. Cooling air will flow along the path 56 and out through the valve 68, with positive pressure causing some leakage through seals, to prevent reverse leakage combustion gases in to the cooling path.

If the valve 68 is now wholly or partially closed, the valve will modulate the airflow through the path 56, to reduce the flow, with the result that the pressure drop across each leg of the path 56 will be correspondingly increased. Flow will continue by virtue of the designed leakage through seals, thus retaining the advantages of positive pressure sealing.

The precise manner in which the pressure will change with the setting of the valve will depend on the details of design of the various legs of the path 58. However, it is envisaged that by modifying the design of the path 58 and the selection of components being cooled by the path, cooling arrangements may be designed which provide appropriate cooling in a range of operating conditions of the engine 10, by appropriate setting of the valve 68.

It is important to note that the valve 68 is at the downstream end of the path 56. This has the advantage that the valve may be positioned at a convenient location, such as in the outer annulus 44. In addition, this provides the significant advantage that if the valve fails, for instance by locking closed, high internal pressures are created within the cooling path. This will resist leakage of combustion gases in to the cooling path, as described above, and will also provide a strong coolant outflow in the event that combustion gases burn through into the cooling path. This coolant outflow will provide a cooling flow to the rest of the system, which would not be possible if a valve at the upstream end had been used and had failed closed. The result is expected to be an increased resistance against catastrophic failure occurring from such burn-through.

In the event that the valve locks open, full cooling will occur at all times, which is unlikely to cause serious failure.

Thus, protection against ingestion of combustion gases into the path 56 is constantly provided because the path 56 will be under pressure along its whole length (to the valve 68) at all times, even if the valve 68 has failed.

A further advantage of the arrangement is to provide a single valve controlling the cooling operations for a plurality of components, thereby simplifying control requirements, and improving reliability.

It will be apparent from the above description that many variations and modifications can be made to the apparatus described, without departing from the scope of the invention. In particular, many alternative path layouts could be designed, including paths which pass through other components or other combinations of components. The invention could in principle be implemented by controlling a cooling path through a single component, by means of a valve at the downstream end of the path within the component, or downstream of the component, but the invention is considered particularly advantageous when implemented to cascade cooling air through a plurality of components, as described above.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A cooling arrangement for a gas turbine engine, said engine having a plurality of components to be cooled and a cooling air supply, the arrangement comprising at least one passage providing a path for cooling air from said cooling air supply and passing consecutively through said plurality of components of the engine, and valve means in the path and operable to modulate the flow of cooling air along the path, the valve means being located downstream of at least some of said plurality of components which are cooled, in use, by the cooling air.

2. An arrangement according to claim 1, wherein the valve is located at the downstream and of that part of the path which passes through the said component.

3. An arrangement according to claim 1, wherein the valve is located downstream of the component.

4. An arrangement according to claim 1, wherein the components include at least one fixed component.

5. An arrangement according to claim 4, wherein the components include a nozzle guide vane or shroud segment.

6. An arrangement according to claim 1, wherein the components include at least one movable component.

7. An arrangement according to claim 6, wherein the components include at least one of fan blades, compressor blades and turbine blades.

8. An arrangement according to claim 6 including a shaft by which the moveable component is carried, wherein the path extends through said shaft, and extends generally radially between the shaft and the movable component.

9. An arrangement according to claim 1, wherein spurs are provided from the path, to provide cooling air to positive pressure seals.

10. An arrangement according to claim 1, wherein the valve means, when opened, allows cooling air to discharge from the downstream end of the path into the combustion gas stream of the engine.

11. A cooling arrangement for a gas turbine engine, said engine having a plurality of components to be cooled and a cooling air supply, the arrangement comprising at least one passage providing a path for cooling air from said cooling air supply and passing consecutively through said plurality of components of the engine, and valve means in the path and operable to modulate the flow of cooling air along the path, the valve means being located downstream of at least some of said plurality of components which are cooled, in use, by the cooling air, a number of said components being fixed relative to other of said components which are movable relative to said fixed components and said cooling air path extending consecutively through both said fixed and movable components.

12. The cooling arrangement of claim 11 wherein the components comprise at least one stator vane and one adjacent rotor blade.

13. The cooling arrangement of claim 11 wherein the valve is located downstream of all of the components to be cooled by the air from the cooling air supply.

* * * * *